E. H. SCHMIDT.
FRICTION DRAFT RIGGING.
APPLICATION FILED APR. 1, 1916.

1,279,016.

Patented Sept. 17, 1918.
2 SHEETS—SHEET 1.

Witnesses:
Raphaël Setter
C. D. Morill

Inventor
Ernest H. Schmidt
By his Attorney
Clarence D. Kent

E. H. SCHMIDT.
FRICTION DRAFT RIGGING.
APPLICATION FILED APR. 1, 1916.
1,279,016.
Patented Sept. 17, 1918.
2 SHEETS—SHEET 2.
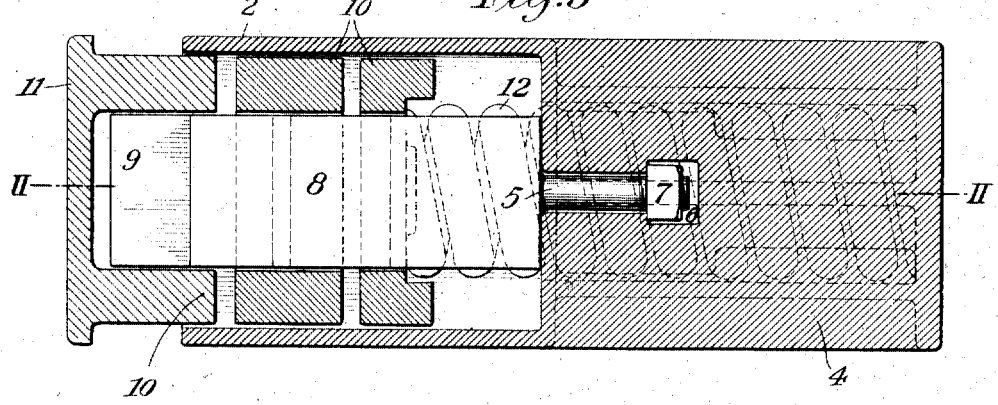
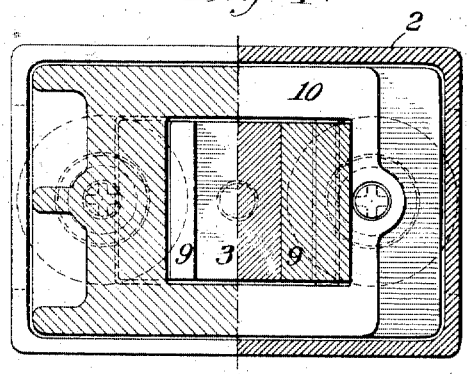
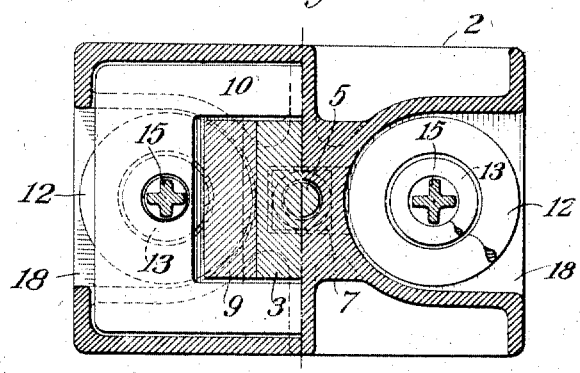
Witnesses:
Raphaël Netter
C. D. Morrill
Inventor
Ernest H. Schmidt
By his Attorney
Clarence D. Kent

UNITED STATES PATENT OFFICE.

ERNEST H. SCHMIDT, OF CLEVELAND, OHIO, ASSIGNOR TO THE NATIONAL MALLEABLE CASTINGS COMPANY, OF CLEVELAND, OHIO, A CORPORATION OF OHIO.

FRICTION DRAFT-RIGGING.

1,279,016.  Specification of Letters Patent.  Patented Sept. 17, 1918.

Application filed April 1, 1916. Serial No. 88,185.

*To all whom it may concern:*

Be it known that I, ERNEST H. SCHMIDT, a citizen of the United States, residing at Cleveland, Cuyahoga county, Ohio, have invented new and useful Improvements in Friction Draft-Rigging, of which the following is a specification, reference being had to the accompanying drawings, in which—

Figure 1:
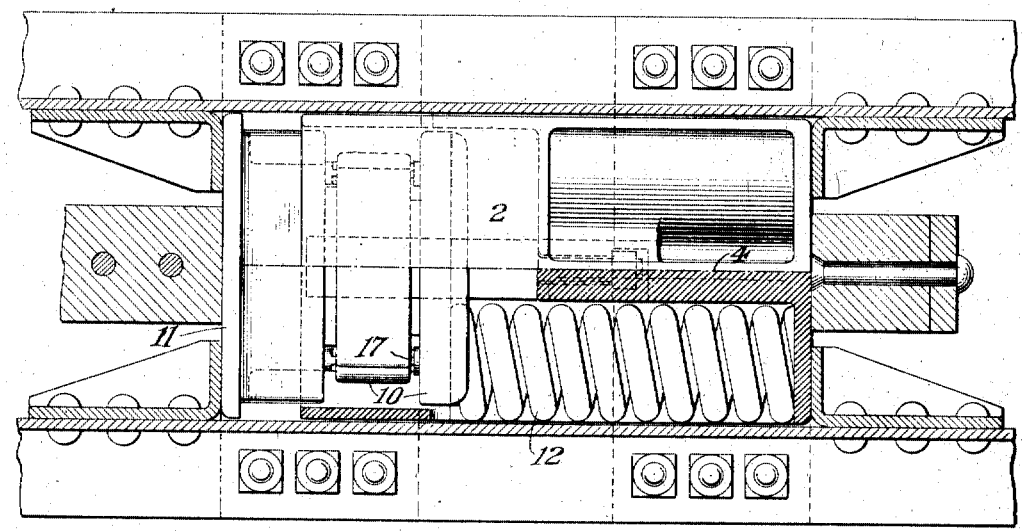
Figure 2:
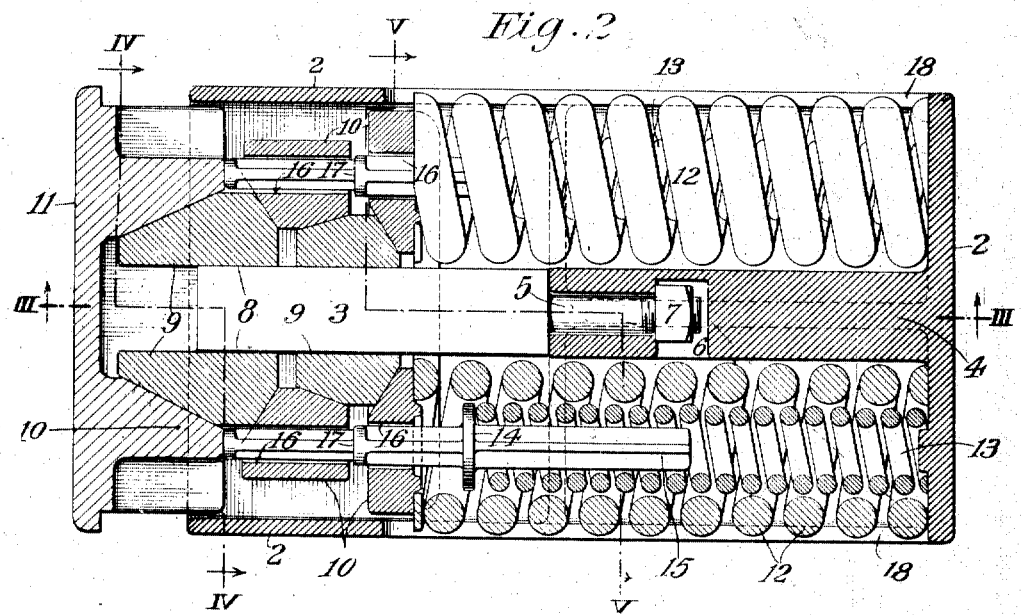

Figure 1 is a plan, partly in section, of my improved rigging, showing its application to the frames of the car; Fig. 2 is a horizontal, longitudinal section on lines II—II of Fig. 3; Fig. 3 is a vertical, longitudinal section on the lines III—III of Fig. 2; Fig. 4 is a section on the lines IV—IV of Fig. 2, and Fig. 5 is a section on the lines V—V of Fig. 2.

My invention relates to friction draft rigging of the type in which the frictional elements are comprised of a plurality of friction shoes, and a central friction member, and in which the friction shoes are adapted to be wedged inwardly against the central member by wedge members. My invention consists in a novel arrangement of the central friction member, the friction shoes, the wedges and the springs, and the coöperation of these parts, which I shall hereinafter describe and claim.

Referring to the drawings, 2 indicates a case containing a central friction member 3, which is preferably rectangular in shape and which is secured to an abutment 4 of the case 2 by a rearwardly-extending bolt 5. The abutment 4 has a recess 6, through which the nut 7 may be applied to the bolt 5. The central friction member has flat, vertically-disposed friction surfaces 8, against which the friction shoes 9 are adapted to bear. There are two friction shoes in each set, which are arranged on opposite sides of the friction member and bear against its vertical faces 8. The wedges 10 are of rectangular shape and press the friction shoes 9 against the friction surfaces 8 of the friction member. The foremost wedge 10 is preferably made integral with the front follower 11. On either side of the abutment 4 is arranged a compression spring 12, which at its rear end bears against the case, and, at its forward end, against the rearmost wedge 10. Within each compression spring 12 is arranged a release spring 13, which, at its rear end, bears against the case, and, at its forward end, against a shoulder 14 on a plunger 15. The plungers 15 have their forward portions seated in apertures 16 in the wedges 10, and, at their forward ends, bear against the foremost wedge 10. The plungers 15 have shoulders 17, which, after the plungers have released the engagement of the foremost wedge 10 and foremost set of shoes 9, bear against the rear faces of an intermediate wedge 10 and release it from its wedging engagement with the second set of shoes.

In assembling the device, the central friction member is first attached to the abutment 4 by the bolt 5 and nut 7, which is applied through the recess 6. The compression springs 12 are then inserted through the apertures 18 in the sides of the case, and the release springs 13 and plungers 15 are then inserted from the forward side of the case, and the wedges 10, friction shoes 9 and front follower 11 are then placed in position.

After buffing or draft the release springs 13 will force the plungers 15 forwardly, thus forcing outwardly the front follower 11. The shoulders 17 will strike the intermediate wedge 10 and push it forwardly, shoving with it the foremost set of friction shoes 9, and the compression spring 12 will then push forwardly the rearmost set of friction shoes 9.

I have found that it is of considerable advantage, from a practical standpoint, to have the friction faces 8 of the friction member 3, and the friction faces of the shoes 9, flat, as they are much easier to manufacture and their wear is more uniform. The use of the two compression springs is also of advantage, since it makes possible an increased capacity in the rigging, while reducing the number of sets of friction shoes and wedges for a given capacity of the rigging. Another advantage lies in the fact that the release springs 13 are contained within the buffing springs, which, with the arrangement of the buffing springs in parallel with the friction member, results in economy of space.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In shock absorbing mechanism, a central member having flat friction faces, friction shoes bearing against said friction faces, wedges in engagement with said friction shoes, a set of compression springs and a set of release springs, each set comprising a plurality of similar springs arranged in twin.

2. In shock absorbing mechanism, a central member having flat friction faces, friction shoes bearing against said friction faces, wedges in engagement with said friction shoes, a set of compression springs, and a set of release springs, the axis of the central member, the friction shoes, wedges and springs being arranged in the same plane.

3. In shock absorbing mechanism, a central friction member, sets of friction shoes bearing thereagainst, wedges engaging said friction shoes, a plurality of compression springs, and release springs contained in the compression springs and operating on the wedges to restore the friction parts to normal position after buffing or draft.

4. In shock absorbing mechanism, a central friction member, sets of friction shoes bearing thereagainst, wedges engaging said friction shoes, a plurality of compression springs, and releasing means contained in the compression springs, said means consisting of spring and plunger mechanism.

5. In shock absorbing mechanism, a central friction member having parallel longitudinally-extending friction faces, sets of friction shoes bearing thereagainst, rectangularly-shaped wedges engaging the shoes, a plurality of compression springs arranged in parallel with the friction member, adapted to resist the movement of the wedges and shoes, and restoring springs supported by the compression springs.

6. In shock absorbing mechanism, a case having an abutment therein, a central friction member secured to said abutment, and friction shoes and wedges arranged about said friction member, the case having openings upon opposite sides of the abutment for insertion of compression and restoring springs.

ERNEST H. SCHMIDT.